US008748504B2

(12) United States Patent
Elimelech et al.

(10) Patent No.: US 8,748,504 B2
(45) Date of Patent: Jun. 10, 2014

(54) POLYMERIC COMPOSITES HAVING ORIENTED NANOMATERIALS AND METHODS OF MAKING THE SAME

(71) Applicant: Yale University, New Haven, CT (US)

(72) Inventors: Menachem Elimelech, New Haven, CT (US); Chinedum Osuji, Norwalk, CT (US); Meagan Mauter, Pittsburgh, PA (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 13/649,472

(22) Filed: Oct. 11, 2012

(65) Prior Publication Data

US 2013/0090405 A1 Apr. 11, 2013

Related U.S. Application Data

(60) Provisional application No. 61/545,830, filed on Oct. 11, 2011.

(51) Int. Cl.
| | | |
|---|---|---|
| B29C 71/04 | (2006.01) | |
| C08F 2/46 | (2006.01) | |
| A61L 2/08 | (2006.01) | |
| A61L 24/00 | (2006.01) | |

(52) U.S. Cl.
USPC ............... 522/71; 522/1; 522/189; 522/184; 520/1

(58) Field of Classification Search
USPC ............... 522/71, 1, 189, 184; 520/1
See application file for complete search history.

(56) References Cited

U.S. PATENT DOCUMENTS

| 5,609,965 | A * | 3/1997 | Esser ........................... 428/522 |
| 6,919,063 | B2 * | 7/2005 | Jang et al. .................. 423/445 B |
| 7,041,401 | B2 * | 5/2006 | Leddy et al. ..................... 429/10 |
| 7,976,935 | B2 * | 7/2011 | Wu et al. ..................... 428/195.1 |
| 2008/0152870 | A1 * | 6/2008 | Takada et al. ................. 428/174 |
| 2011/0108523 | A1 * | 5/2011 | Yang et al. ...................... 216/56 |

OTHER PUBLICATIONS

Park, Cheol, John Wilkenson, Sumanth Banda, Zoubeida Ounaies, Kristopher E. Wise, Godfrey Sauti, Peter Lillehel, and Joycelyn S. Harrison, Aligned Single Wall Carbon Nanotube Polymer Composites Using an Electric Field, 2006, Journal of Polymer Science: Part B: Polymer Physics, 1751-7162.*
Ahir et al., "Polymers with aligned carbon nanotubes: Active composite materials" 2008, Polymer 49:3841-3854.
Ajiki et al., "Magnetic Properties of Carbon Nanotubes" 1993, J. Phys. Soc. Jpn. 62:2470-2480 (abstract).
Ajiki et al., 1994, "Aharonov-Bohm effect in carbon nanotubes" Physica B: Condensed Matter 201:349-352.
Chatterjee et al. "Single-Walled Carbon Nanotube Dispersions in Poly(ethylene oxide)", 2005, Advanced Functional Materials 15:1832-1838.
Choi, et al., "Enhancement of thermal and electrical properties of carbon nanotube polymer composites by magnetic field processing," 2003, J. Appl. Phys. 94:6034-6039.
Clawson et al., "Magnetic alignment of aqueous CTAB in nematic and hexagonal liquid crystalline phases investigated by spin-1 NMR" 2006, Phys Chem Chem. Phys 8:2635-2641.
Du, et al. "Effect of nanotube alignment on percolation conductivity in carbon nanotube/polymer composites" 2005, Physical Review B 72:121404-4.
Duesberg et al., "Polarized raman spectroscopy on isolated single-wall carbon nanotubes." 2000, Phys. Rev. Lett. 85(25):5436-5439.
Fagan et al., "Comparative measures of single-wall carbon nanotube dispersion." 2006, J Phys Chem B 110:23801-23805.
Fagan et al., "Dielectric response of aligned semiconducting single-wall nanotubes." 2007 Phys. Rev. Lett. 98:147402.
Firouzi et al., "Magnetic-Field-Induced Orientational Ordering of Alkaline Lyotropic Silicate-Surfactant Liquid Crystals." 1997, Journal of the American Chemical Society 119:9466-9477.
Haggenmueller et al., "Aligned single-wall carbon nanotubes in composites by melt processing methods." 2000, Chemical Physics Letters 330:219-225.
Holt et al., "Fast mass transport through sub-2-nanometer carbon nanotubes." 2006, Science 312:1034-1037.
Jin et al., "Alignment of carbon nanotubes in a polymer matrix by mechanical stretching." 1998, Appl. Phys. Lett. 73:1197-1199.
Kang et al., "Well-aligned CdS nanorod/conjugated polymer solar cells." 2006, Solar Energy Materials and Cells 90:166-174.
Kim et al., "Scalable fabrication of carbon nanotube/polymer nanocomposite membranes for high flux gas transport." 2007, Nano Lett. 7:2806-2811.
Lagerwall et al., "Nanotube Alignment Using Lyotropic Liquid Crystals." 2007, Advanced Materials 19:359-364.
Lester et al., "Ordering effects on the photopolymerization of a lyotropic liquid crystal." 2002, Polymer 43:3707-3715.
Lopez-Lorente et al., "The potential of carbon nanotube membranes for analytical separations." 2010, Anal Chem. 82(13):5399-407.
Majewski et al., "Non-degenerate magnetic alignment of self-assembled mesophases." 2009, Soft Matter 5:3417-3421.
Majumder et al., "Effect of tip functionalization on transport through vertically oriented carbon nanotube membranes." 2005, J Am Chem Soc. 127:9062-9070.
McGrath, "Phase Behavior of Dodecyltrimethylammonium Bromide/Water Mixtures." 1995, Langmuir 11:1835-1839.

(Continued)

*Primary Examiner* — Ling Choi
*Assistant Examiner* — Jessica E Whiteley
(74) *Attorney, Agent, or Firm* — Riverside Law LLP

(57) ABSTRACT

The present invention relates to the development and fabrication of thin-film polymer nanocomposites containing vertically aligned nanomaterials, such as single-walled carbon nanotubes (SWNTs). In certain embodiments, the present invention utilizes liquid crystal mesophases of hexagonally packed cylindrical micelles that orient with their long axes parallel to an applied magnetic field, thereby directing the alignment of the nanomaterials, such as SWNTs, sequestered in the micellar cores. In certain embodiments, the mesophase may be a stable, single-phase material containing monomers that can be polymerized after nanotube alignment to form the nanocomposite polymer.

16 Claims, 10 Drawing Sheets

(56) References Cited

OTHER PUBLICATIONS

Moniruzzaman et al., "Polymer Nanocomposites Containing Carbon Nanotubes." 2006, Macromolecules 39:5194-5205.

Osuji et al., "Alignment of Self-Assembled Hierarchical Microstructure in Liquid Crystalline Diblock Copolymers Using High Magnetic Fields." 2004, Macromolecules 37:9903-9908.

Park et al., "Aligned single-wall carbon nanotube polymer composites using an electric field," 2006, Journal of Polymer Science Part B: Polymer Physics 44:1751-1762.

Pike et al., "Percolation and conductivity: A computer study. I." 1974, Physical Review B 10:1421-1434.

Rapp et al., "The Alignment of Lyotropic Liquid Crystals Formed by Hexadecyltrimethylammonium Bromide in D2O in a Magnetic Field." 1999, J Phys Chem B 103:1705-1711.

Sandler et al., "Ultra-low electrical percolation threshold in carbon-nanotube-epoxy composites." 2003, Polymer 44:5893-5899.

Searles et al., "Large anisotropy in the magnetic susceptibility of metallic carbon nanotubes." 2010, Phys. Rev. Lett. 105(1):017403.

Shao, et al., "Magnetic-field induced orientation and anisotropic susceptibility of normal alkanes." 1998, Physical Review E 57:R6265-R6268.

Shaver et al., "Alignment dynamics of single-walled carbon nanotubes in pulsed ultrahigh magnetic fields." 2009, ACS Nano 3:131-138.

Smith et al., "Structural anisotropy of magnetically aligned single wall carbon nanotube films," 2000, Appl. Phys. Lett. 77:663-665.

Thostenson and Chou, "Aligned multi-walled carbon nanotube-reinforced composites: processing and mechanical characterization." 2002, J. Phys. D-Appl. Phys. 35:L77-L80.

Vigolo et al., "Macroscopic fibers and ribbons of oriented carbon nanotubes." 2000, Science 290:1331-1334.

Walters et al., "In-plane-aligned membranes of carbon nanotubes." 2001, Chemical Physics Letters 338:14-20.

Wenseleers et al., "Efficient Isolation and Solubilization of Pristine Single-Walled Nanotubes in Bile Salt Micelles." 2004, Advanced Functional Materials 14:1105-1112.

\* cited by examiner

POLYMERIC COMPOSITES HAVING ORIENTED NANOMATERIALS AND METHODS OF MAKING THE SAME

CROSS-REFERENCE TO RELATED APPLICATIONS

This application claims the benefit of priority of U.S. Provisional Application No. 61/545,830 filed Oct. 11, 2011, the entire disclosure of which is incorporated by reference herein in its entirety.

STATEMENT REGARDING FEDERALLY SPONSORED RESEARCH OR DEVELOPMENT

This invention was made with government support under DMR-0847534 and CTS-0120978 awarded by the National Science Foundation (NSF). The government has certain rights in the invention.

BACKGROUND OF THE INVENTION

Many properties of polymer nanocomposites are determined by the anisoptropy and orientation of the sequestered nanomaterials. In some cases, the anisotropy of the nanomaterial is useful only for the realization of an isotropic system property. For example, the bulk mechanical properties of polymer melts may be enhanced by the inclusion of high-aspect ratio nanoparticles, which have a lower percolation threshold than an equivalent mass of spherical nanoparticles (Pike et al., 1974, Physical Review B 10:1421-1434). In other cases, the anisotropy of the sequestered nanomaterial imparts "higher level" anisotropy in the bulk properties of the system. Controlled orientation of nanomaterial inclusions in polymer films produced demonstrations of anisotropic permeability (Pike et al., 1974, Physical Review B 10:1421-1434; Holt et al., 2006, Science 2006, 312:1034-1037) thermal (Choi, et al., 2003, J. Appl. Phys. 94:6034-6039; Moniruzzaman et al., 2006, Macromolecules 39:5194-5205) and electrical (Du, et al. 2005, Physical Review B 72:121404-4; Sandler et al., 2003, Polymer 44:5893-5899) conductivity, enhanced mechanical properties (Haggenmueller et al., 2000, Chemical Physics Letters 330:219-225; Thostenson and Chou, 2002, J. Phys. D-Appl. Phys. 35:L77-L80), and photovoltaic activity (Ahir et al., 2008, Polymer 49:3841-3854; Kang et al., 2006, Solar Energy Materials and Cells 90:166-174).

Current methods for controlling orientation in nanocomposite materials, however, are limited by their effectiveness and scalability. For example, for polymeric materials containing single-walled carbon nanotubes (SWNTs), mechanical shear (Jin et al., 1998, Appl. Phys. Lett. 73:1197-1199), anisotropic flow (Haggenmueller et al., 2000, Chemical Physics Letters 330:219-225; Kim et al., 2007, Nano Lett. 7:2806-2811), gel extrusion (Vigolo et al., 2000, Science 290:1331-1334), melt stretching (Fagan et al., 2007 Phys. Rev. Lett. 98:147402), magnetic fields (Lagerwall et al., 2007, Advanced Materials 19:359-364; Walters et al., 2001, Chemical Physics Letters 338:14-20), and electric fields (Park et al., 2006, Journal of Polymer Science Part B: Polymer Physics 44:1751-1762) have been used to varying effect to induce nanotube alignment. Despite these efforts, the fabrication of aligned SWNT-polymer nanocomposite matrices remains difficult, particularly in thin-film geometries where vertical alignment of the SWNTs in polymer films is attractive for applications in size and chemo-selective transport (Majumder et al., 2005, J Am Chem Soc. 127:9062-9070; Lopez-Lorente et al., 2010, Anal Chem. 82(13):5399-407).

Thus, a need exists for systems and methods of aligning nanomaterials within mesophases and polymerized nanocomposites. The present invention fulfills these needs.

SUMMARY OF THE INVENTION

The present invention relates to the development and fabrication of thin-film polymer nanocomposites containing vertically aligned nanomaterials, such as single-walled carbon nanotubes (SWNTs). In certain embodiments, the present invention utilizes liquid crystal mesophases of hexagonally packed cylindrical micelles that orient with their long axes parallel to an applied magnetic field, thereby directing the alignment of the nanomaterials, such as SWNTs, sequestered in the micellar cores. In certain embodiments, the mesophase may be a stable, single-phase material containing monomers that can be polymerized after nanotube alignment to form the nanocomposite polymer.

Accordingly, the present invention relates to a method of aligning a nanomaterial in a polymeric film. The method includes the steps of adding at least one nanomaterial into a mesophase comprising at least one surfactant and at least one monomer, applying a magnetic field to the mesophase, wherein the at least one surfactant and nanomaterial at least partially align in response to the magnetic field, and polymerizing the mesophase to form a film containing the at least partially aligned surfactant and nanomaterial.

In one embodiment, the mesophase includes a crosslinker. In another embodiment, the mesophase includes a photoinitiator. In another embodiment, the monomer is polymerized by exposing the mesophase to UV light. In another embodiment, the at least one surfactant is dodecyltrimethylammonium bromide (DTAB). In another embodiment, the at least one monomer is hydroxyethylmethacrylate (HEMA). In another embodiment, the nanomaterial is a single walled carbon nanotube. In another embodiment, the crosslinker is poly(ethylene glycol)-400 dimethacrylate. In another embodiment, the photoinitiator is Darocur TPO. In another embodiment, the method also includes the steps of raising the temperature of the mesophase such that the at least one surfactant is in a disordered state prior to applying the magnetic field to the mesophase, and controlling the rate of cooling of the mesophase as the surfactant returns to an ordered state while the magnetic field is applied. In another embodiment, the nanomaterial is mixed in a solution comprising a dispersing agent prior to adding the nanomaterial to the mesophase. In another embodiment, the dispersing agent is sodium taurodeoxycholate (TDOC). In another embodiment, the present invention includes a polymeric film formed by the method described herein. In another embodiment, the amount of DTAB in the mesophase is between 30-60%. In another embodiment, the amount of HEMA in the mesophase is between 10-30%. In another embodiment, the at least partial alignment of the at least one surfactant and nanomaterial is directed by a magnetic field strength of less than 6 Tesla (T).

The present invention also relates to a nanocomposite that includes at least one nanomaterial, at least one surfactant, at least one monomer, at least one crosslinker, and at least one photoinitiator, wherein the at least one nanomaterial and surfactant are at least partially aligned via exposure to a magnetic field, and wherein the at least one monomer is polymerized via exposure to UV light after the at least one nanomaterial and surfactant are at least partially aligned. In one embodiment, the at least one nanomaterial is a single walled carbon nanotube, the at least one surfactant is dodecyltrimethylammonium bromide (DTAB), the at least one monomer is hydroxyethylmethacrylate (HEMA), the at least one crosslinker is poly(ethylene glycol)-400 dimethacrylate, and the at least one photoinitiator is Darocur TPO.

The present invention also relates to a method of fabricating a nanocomposite. The method includes the steps of adding at least one nanomaterial into a mesophase comprising dodecyltrimethylammonium bromide (DTAB), hydroxyethylmethacrylate (HEMA), poly(ethylene glycol)-400 dimethacrylate and Darocur TPO, raising the temperature of the mesophase such that the mesophase is in a disordered state, applying a magnetic field having a strength of less than 6 Tesla to the mesophase, wherein the DTAB at least partially aligns in response to the magnetic field, controlling the rate of cooling of the mesophase as it returns to an ordered state, and polymerizing the mesophase to form a polymeric film containing the at least one nanomaterial. In one embodiment, the at least one nanomaterial is a single walled carbon nanotube.

BRIEF DESCRIPTION OF THE DRAWINGS

For the purpose of illustrating the invention, there are depicted in the drawings certain embodiments of the invention. However, the invention is not limited to the precise arrangements and instrumentalities of the embodiments depicted in the drawings.

FIGS. 2A-2E, depicts the chemical structures of polymeric nanocomposite constituents. FIG. 2A is Dodecyltrimethylammonium Bromide (DTAB); FIG. 2B is Photoinitiator Darocur TPO (Ciba Specialty Chemicals); FIG. 2C is Sodium taurodeoxycholate (TDOC); FIG. 2D is Hydroxyethylmethacrylate (HEMA); and FIG. 2E is polymerization reaction of HEMA to form poly(hydroxyethylmethacrylate).

FIGS. 3A-3D, depicts the phase behavior of stable mesophase. FIG. 3A depicts scattering intensity versus scattering vector plotted from WAXS, demonstrating hexagonal packing of cylindrical micelles in the mesophase, where the inset of FIG. 3A depicts 2D scattering from WAXS image plate. FIG. 3B depicts temperature dependent SAXS, confirming temperature region of order-disorder transition; FIG. 3C depicts transmitted intensity of polarized light as a function of temperature, illustrating order-disorder transition at 45° C.; and FIG. 3D demonstrates polarized optical micrographs depicting liquid crystalline texture of the mesophase as a function of temperature.

FIGS. 4A-4D, depicts SAXS patterns of pre- and post-polymerized aligned samples. The arrows and cross indicate the direction of the applied magnetic field in the plane and out of the plane, respectively. FIG. 4A depicts in-plane alignment of sample before polymerization; FIG. 4B depicts out-of-plane alignment of sample before polymerization; FIG. 4C depicts scattering from in-plane aligned sample after polymerization, showing that the system retains its alignment after polymerization of the host matrix; and FIG. 4D depicts integrated SAXS data showing that the pre- and post-polymerized samples have similar d-spacings of 3.2 and 3.3 nm, respectively.

FIGS. 7A-7C, are charts depicting Raman spectroscopy and scattering intensities of the SWNT/host matrix. FIG. 7A depicts non-polarized Raman spectroscopy of SWNT and the host mesophase; FIG. 7B depicts polarized Raman spectroscopy of aligned nanocomposite material; and FIG. 7C depicts normalized peak intensity calculated from the magnitude of the characteristic G band peak (1590 $cm^{-1}$) for SWNT and normalized to average baseline intensity between 1510 and 1540 $cm^{-1}$.

FIGS. 8A-8C, depicts fluorescence emission spectra (785 nm excitation wavelength) demonstrating dispersal of SWNT in 8A) TDOC solution; 8B) Peak fitting to characterize diameter and metallic/semi-conducting ratios of SWNT: and 8C) SWNT sequestered in DTAB lyotropic LC phase.

FIGS. 9A and 9B, depict TEM of nanotubes showing high quality, small diameter materials. FIG. 9A shows purified SWNT; and FIG. 9B shows SWNT dispersed in TDOC showing effective dispersal of SWNT.

FIGS. 10A-10C, depict matrix compositions with varying weight percentages of SWNTs. The SWNTs are well-dispersed in the matrix over the concentration ranges tested. FIG. 10A depicts 0.076 weight percent SWNTs, FIG. 10B depicts 0.028 weight percent SWNTs and FIG. 10C depicts zero weight percent SWNTs (pure matrix).

DETAILED DESCRIPTION OF THE INVENTION

Figure 1:
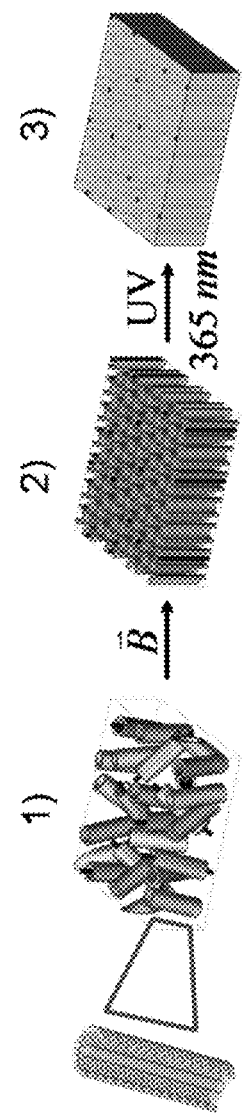
FIG. 1 is a schematic for an exemplary fabrication of vertically aligned SWNT polymer nanocomposite thin-film. Step (1) depicts sequestration of SWNT into cylindrical micelle mesophase; step (2) depicts the magnetic field alignment of cylindrical micelles; and step (3) depicts polymerization of the mesophase to form a polymer thin-film embedded with vertically aligned SWNT.

The present invention relates to the development and fabrication of thin-film polymer nanocomposites containing vertically aligned nanomaterials, such as single-walled carbon nanotubes (SWNTs). In certain embodiments, the present invention utilizes liquid crystal mesophases of hexagonally packed cylindrical micelles that orient with their long axes parallel to an applied magnetic field, thereby directing the alignment of the nanomaterials, such as SWNTs, sequestered in the micellar cores. In certain embodiments, the mesophase may be a stable, single-phase material containing monomers that can be polymerized after nanotube alignment to form the nanocomposite polymer. The space pervasive nature of magnetic fields and the tunable physicochemical properties of multicomponent mesophases make this an attractive approach that can be leveraged for application in diverse nanocomposite systems.

DEFINITIONS

As used herein, each of the following terms has the meaning associated with it in this section. Unless defined otherwise, all technical and scientific terms used herein generally have the same meaning as commonly understood by one of ordinary skill in the art to which this invention belongs.

The articles "a" and "an" are used herein to refer to one or to more than one (i.e. to at least one) of the grammatical object of the article. By way of example, "an element" means one element or more than one element.

As used herein, the term "about" will be understood by persons of ordinary skill in the art and will vary to some extent depending on the context in which it is used. As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

As used herein, the term "mesophase" refers to the ordered phases of matter formed by anisotropic molecular or colloidal species as a function of temperature, concentration, pressure, ionic strength (salt content) or combinations thereof.

As used herein, the term "mesogen" refers to the constituents of mesophases.

As used herein, the term "liquid crystal" refers to a thermodynamic stable phase characterized by anisotropy of properties without the existence of a three-dimensional crystal lattice, generally lying in the temperature range between the solid and isotropic liquid phase.

As used herein, the term "lyotropic" refers to molecules that form phases with orientational and/or positional order in a solvent. Lyotropic liquid crystals can be formed using amphiphilic molecules (e.g., dodecyltrimethylammonium bromide, sodium laurate, phosphatidylethanolamine, lecithin). The solvent can be water.

As used herein, the term "nanomaterial" refers to a material, e.g., a particle, a nanotube, having at least one dimension, e.g., a diameter, in a range of 1 nm to less than 1 µm. As used herein, the term "nanotube" refers to an article having a narrow dimension (diameter) of about 1-1000 nm.

As used herein, the term "monomer," refers to any molecule that can be polymerized, that is, linked together via a chemical reaction to form a higher molecular weight species.

As used herein, the term "polymer" denotes a covalently bonded chain of monomer units, and is intended to include both homopolymers and copolymers.

As used herein, the term "initiator," in accordance with the definition adopted by the IUPAC, refers to a substance introduced into a reaction system in order to bring about reaction or process generating free radicals or some other reactive reaction intermediates which then induce a chain reaction.

As used herein, the term "photoinitiator," in accordance with the definition adopted by the IUPAC, refers to a substance capable of inducing the polymerization of a monomer by a free radical or ionic chain reaction initiated by photoexcitation.

The term "crosslinker" refers to compounds that are able to react with the functional group or groups on the polymer chains to lengthen them and/or connect them, e.g., to form a crosslinked network like that of a cured elastomer.

As used herein, the term "DTAB" refers to dodecyltrimethylammonium bromide.

As used herein, the term "Darocur TPO" refers to 2,4,6-trimethylbenzoyl-diphenylphosphine oxide.

As used herein, the term "TDOC" refers to sodium taurodeoxycholate.

As used herein, the term "HEMA" refers to hydroxyethylmethacrylate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

As described herein, the present invention provides for the facile and scalable synthesis of polymeric nanocomposites containing oriented nanomaterials. For example, as illustrated in FIG. 1, magnetically aligned liquid crystalline (LC) mesophases formed by surfactants act as structure directing templates for the alignment of sequestered nanomaterials. The surfactant mesophase may be polymerizable, either inherently due to the structure of the surfactant, or via the incorporation of a monomeric species in the formulation of the mesophase. The slow relaxation of lyotropic phases preserves nanomaterial orientation until post-alignment photopolymerization of the system forms the nanocomposite support matrix. The space-pervasive nature of magnetic fields enables simple control over orientation, and provides excellent compatibility with thin-film geometries, and is inherently scalable to macroscopic dimensions exceeding several centimeters. Furthermore, the chemical diversity of species capable of forming lyotropic mesophases provides a rich parameter space for addressing issues related to nanomaterial dispersion, functionalization, and monomer/polymer compatibility.

As contemplated herein, the resulting polymeric nanocomposites may be used in reinforced polymeric materials, solar cells, or aligned carbon nanotube membranes, and any other such application enhanced by the presence of oriented and/or controlled dispersement pattern of nanomaterials.

Nanomaterials

The present invention may be used to align, orient and control the dispersement of nanomaterials into an LC mesophase system as described herein. As contemplated herein, the present invention can align, orient, sequester and/or control the dispersement of any type of nanomaterial as would be understood by those skilled in the art. Further, there is no limit to the number of different nanomaterials used, or the amounts of one or more nanomaterials used. For example, such nanomaterials may have any shape, including generally spheres, elipsoids, or elongated shapes such as cylinders, or may be otherwise characterized as powders, particles, fullerenes or tubes. Such nanomaterials may or may not be conductive of electrons, ions, heat or light. Such nanomaterials may or may not have magnetic or catalytic properties. By non-limiting example, such nanomaterials may be carbon-based, semiconductor crystal such as quantum dots, metals such as gold, silver, titanium, metal oxides, and the like. In certain embodiments, the nanomaterial is anisotropic. In certain embodiments, the nanotubes are carbon nanotubes. In other embodiments, the nanotubes are inorganic nanotubes. In a preferred embodiment, the nanomaterials are nanotubes, such as SWNTs. In another embodiment, the nanotubes are multi-walled nanotubes (MWNT). Other suitable nanomaterials include zinc oxide (ZnO) nanowires, nanotubes and nanoparticles, titania ($TiO_2$) nanowires and nanoparticles, platinum nanowires and nanoparticles, boron nanowires, nanotubes and nanoparticles, gold nanowires and nanoparticles, silver nanowires and nanoparticles and grapheme sheets.

LC Mesophase

As contemplated herein, a LC mesophase is used to disperse, align, orient and/or sequester one or more nanomaterials. The LC mesophase may be composed of one more surfactants or other chemical constituents. In certain embodiments, the mesophase may be a single-component material. In other embodiments, the mesophase may be multicomponent, having tunable physicochemical properties. In other embodiments, the mesophase may be anisotropic, lyotropic, thermotropic and/or metallotropic. In preferred embodiments, the mesophase may be responsive to a magnetic field.

The mesophase may include one or more surfactants that induces a structural ordering of the LC system. The surfactant may be any liquid-crystalline molecule having at least one rigid moiety and one or more flexible moieties. For example, the surfactant may be a discotic LC or a calamitic LC. The surfactant may be amphiphilic, having at least one hydrophilic moiety and at least one lipophilic moiety. The one or more surfactants may be cationic, anionic, nonionic, zwitterionic, or any combination thereof. In certain embodiments, the surfactant is cationic. In a preferred embodiment, the surfactant is dodecyltrimethylammonium bromide (DTAB). In another embodiment, the surfactant is sodium dodecyl sulfate. In another embodiment, the surfactant is cetyltrimethylammonium bromide. In another embodiment, the surfactant is an n-alkyl ether of polyethylene oxide. In another embodiment, the surfactant is a nonylphenol oligo-ethylene glycol species. In another embodiment, the surfactant is a triblock copolymer of polypropylene oxide-ethylene oxide-propylene oxide). In one embodiment, the surfactant of the mesophase form hexagonally packed cylindrical micelles. These cylindrical micelles sequester the nanomaterial within the micelle core, and serve as a template for the alignment of nanomaterial.

The mesophase may also contain one or more polymerizable constituents. For example, the mesophase may include one or more types or category of monomer suitable for forming a polymeric structure. The monomer may be synthetic, organic, or any other type of polymerizable monomeric molecule. The monomer may contain a type of polymerizable group. A polymerizable group is a chemical moiety that polymerizes under certain chemical conditions. In general, the type of polymerizable group is not critical, so long as the polymerizable group is capable of polymerization with a monomer of the instant invention. Examples of polymerizable groups include double-bond containing moieties which are polymerized by photopolymerization or free radical polymerization. In some embodiments, the polymerizable group is a vinyl group, acryl group, alkylacryl group (i.e. acryl group having an alkyl substituent, such as methacryl). As used herein, acryl (alkylacryl, methacryl, etc) includes acryl esters as well as acryl amides. In another embodiment, the monomer may be any alkyl methacrylate. In another embodiment, the monomer may be styrene, vinyl acetate, vinyl pyridine, n-isopropylacrylamide or a vinyl ether. In a preferred embodiment, the monomer may be hydroxyethyl methacrylate (HEMA).

The mesophase may also include one or more crosslinkers and/or initiators, depending on the mechanism and the amount of polymerization and crosslinking desired. As contemplated herein, any type of crosslinker and/or initiator may be used as would be understood by those skilled in the art. Examples of initiators include, but are not limited to, thermal initiators, photoinitiators, redox reaction initiators, persulfates, ionizing radiation initiators, and ternary initiators. Other photoinitiators and thermal initiators include those based on benzophenones as well as those based on peroxides. In a preferred example, the initiator is a photoinitiator. Examples of crosslinkers include, without limitation, polycarboxylic acids, polyamines, polyisocyanates, polyepoxides, and polyhydroxyl containing species. Other crosslinkers include bi- and multifunctional vinyl ethers, acrylamides and acrylates. Examples of such are the crosslinker poly(ethylene glycol)-400 dimethacrylate, and the photoinitiator Darocur TPO.

Further, the mesophase may also include constituents used to aid in the dispersement of nanomaterials. Examples of dispersants include, but are not limited to, anionic low-molecular-weight surfactants, cationic low-molecular-weight surfactants, nonionic low-molecular weight surfactants, anionic polymer dispersants, cationic polymer dispersants, nonionic polymer dispersants, and inorganic dispersants. In certain embodiments, the dispersant is an anionic surfactant. For example, the nanomaterials may be suspended in sodium taurodeoxycholate (TDOC).

In still other embodiments, the mesophase may include one or more other solvents, such as water, as would be understood by those skilled in the art.

The mesophase may be of any volume, and is not limited to any particular geometry. Thus, the mesophase may take the shape and size of any mold or container in order to produce, upon polymerization, a polymerized structure of desired geometry. For example, in one embodiment, the mesophase is shaped to form a thin-film polymer.

As contemplated herein, the mesophase can be formed of varying amounts of surfactant and other constituents, depending on the desired nanocomposite being formed. For example, in certain embodiments, the mesophase may include between 20-80% surfactant, 10-60% solvent, 5-50% monomer, 0-10% crosslinker, 0-10% photoinitiator and 0-5% dispersing agent. In a preferred embodiment, the mesophase includes 47.5% surfactant, 33% water, 18% HEMA, 1% poly(ethylene glycol)-400 dimethacrylate and 0.5% Darocur TPO.

In certain embodiments, the mesophase may include an amount of surfactant equal to about 30%, about 35%, about 40%, about 45%, about 46%, about 47%, about 47.5%, about 48%, about 49%, about 50%, about 55% or about 60%. As would be understood by the skilled artisan, the particular amount of the surfactant is dependent on the type of surfactant used. Thus, the amount of the surfactant is only limited by the amount needed to form hexagonally packed cylindrical micelles.

In certain embodiments, the mesophase may include an amount of solvent equal to about 20%, about 25%, about 30%, about 35% and about 40%.

In certain embodiments, the mesophase may include an amount of monomer equal to about 10%, about 15%, about 16%, about 17%, about 18%, about 19%, about 20%, about 25% and about 30%.

In certain embodiments, the mesophase may not include any crosslinker. In other embodiments, the mesophase may include an amount of crosslinker equal to about 0.1%, about 0.5%, about 0.6%, about 0.7%, about 0.8%, about 0.9%, about 1%, about 1.1%, about 1.2%, about 1.3%, about 1.4%, about 1.5%, about 2%, about 3%, about 4% or about 5%.

In certain embodiments, the mesophase may not include any photoinitiator. In other embodiments, the mesophase may include an amount of photoinitiator equal to about 0.1%, about 0.2%, about 0.3%, about 0.4%, about 0.5%, about 0.6%, about 0.7%, about 0.8%, about 0.9%, about 1%, about 2%, about 3%, about 4% or about 5%.

In certain embodiments, the mesophase may include an amount of dispersing agent equal to about 0.1%, about 0.5%, about 0.6%, about 0.7%, about 0.8%, about 0.9%, about 1%, about 1.1%, about 1.2%, about 1.3%, about 1.4%, about 1.5%, about 2%, about 3%, about 4% or about 5%.

In a preferred embodiment, the mesophase system may contain about 47.5% dodecyltrimethlyammonium bromide, about 33% deionized water, about 18% hydroxyethyl methacrylate, about 1% poly(ethylene glycol)-400 dimethacrylate, and about 0.5% Darocur TPO. Nanomaterials, for example SWNTs, are then introduced to this mesophase system via dispersal in the aqueous phase.

Magnetic Alignment

Magnetic field alignment of materials may be driven by anisotropy of magnetic susceptibility, expressed coherently on a length scale sufficient to create a free energy difference between aligned and unaligned states that is significant with respect to thermal energy, kT. In this respect, magnetic alignment is analogous to electric field alignment. The magnetic free energy difference $\Delta F_M$ scales as $\Delta\chi B^2$, where $\Delta\chi$ is the anisotropy of magnetic susceptibility and B is the field strength, whereas the electric free energy $\Delta F_E$ scales as $\Delta\in E^2$, where $\Delta\in$ is the anisotropy of dielectric permittivity and E the field strength. In practical application, however, magnetic fields possess a number of advantages over electric fields. The simple space pervasive nature of magnetic fields, the absence of electrode contact issues, and the independence from dielectric breakdown concerns allow for magnetic alignment of diamagetically anisoptropic materials without severe constraints on the geometry or form factor of the system (Osuji et al., 2004, Macromolecules 37:9903-9908).

For nanocomposite systems with low intrinsic anisotropy or small correlation volumes, direct magnetic alignment requires field strengths that are impractical for commercial processes. Direct alignment of nanomaterials, such as nanotubes, requires magnetic field strengths between 10 and 35 T (Shaver et al., 2009, ACS Nano 3:131-138; Smith et al., 2000, Appl. Phys. Lett. 77:663-665), depending on the chirality and diameter of the SWNTs (Searles et al., 2010, Phys. Rev. Lett. 105(1):017403), due to the large competing effect of thermal forces on the single tube length scale (Ajiki et al., 1993, J. Phys. Soc. Jpn. 62:2470-2480). However, according to the system and methods of the present invention, the alignment of the nanomaterial is templated via sequestration in an appropriate lyotropic or thermotropic mesophase which can be aligned at lower field strengths of between 1-6 T. For example, in certain embodiments, the mesophase can be aligned or oriented at a field strength of less than 6 T, less than 5 T, less than 4 T, less than 3 T, less than 2 T or even less than 1 T. For example, the alkyl tails of prototypical ionic surfactants, such as dodecyltrimethlyammonium bromide and sodium dodecyl sulfate, and of non-ionics such as Brij possess a negative diamagnetic anisotropy and align perpendicularly to an applied magnetic field (Majewski et al., 2009, Soft Matter 5:3417-3421; Shao, et al., 1998, Physical Review E 57:R6265-R6268). Self-assembly of the surfactant molecules into cylindrical micelles imparts a positive diamagnetic anisotropy to the micelle as a whole, due to the orthogonality of the alkyl tail to the long axis of the cylindrical structure. Thus, in the hexagonal or $H_I$ phase, the long axes of the hexagonally packed cylindrical micelles orient parallel to the applied magnetic field (Clawson et al., 2006, Phys Chem Che. Phys 8:2635-2641; Firouzi et al., 1997, Journal of the American Chemical Society 119:9466-9477; Rapp et al., 1999, J Phys Chem B 103:1705-1711).

In a nanocomposite mesophase containing anisotropic nanomaterials, the free energy minimum may be produced by parallel alignment of the nanomaterials with respect to the mesophase director field, as this arrangement minimizes elastic distortions of the mesophase. Sequestration of nanomaterials, such as SWNTs, within the mesophase template thus enables nanotube alignment concurrent with the alignment of the mesophase (Lagerwall et al., 2007, Advanced Materials 19:359-364). The final consideration in mesophase alignment is the kinetic limitation to mesogen orientation. While the thermodynamic preference for materials with positive diamagnetic anisotropy is to align parallel to the applied magnetic field, the slow kinetics in viscous systems can prolong the LC matrix in a non-equilibrium, unaligned state. Efficient or rapid alignment of the mesophase may be provided by the imposition of the magnetic field during the thermally driven disorder-to-order transition of the system. In the vicinity of this transition temperature, $T_{ODT}$, the evolution of the structure is strongly coupled to alignment as ordered material nucleates in the presence of the field and the thermally enhanced mobility of the system facilitates fast alignment.

The temperature of the mesophase system in the magnetic field may be manipulated during all or any portion of the application of the magnetic field. In certain embodiments, control of temperature may be automated through a programmable temperature controller (Omega, Stamford, Conn.) that provides temperature control within 0.1° C. of set points, for example. Initially, the mesophase system may be heated above a threshold or temperature suitable for transitioning the mesophase surfactants and other constituents from an ordered state to a disordered state. For example, if the threshold temperature is 42° C., the system can be raised to a first temperature such as between 55-75° C., and held at that temperature for at least 1 minute before cooling through $T_{ODT}$ to a second temperature of between about 30-40° C. at a rate of between 0.1-1.0° C./minute. In a preferred embodiment, the mesophase system may be heated to a threshold or melting temperature of about 65° C., and held at that temperature for 1 minute before cooling through $T_{ODT}$ to a second temperature of about 35° C. at a rate of between 0.5° C./minute. In other embodiments, sample annealing under the magnetic field between 30-35° C. may be performed to improve the orientational order of the mesophase components in the system.

Polymerization

After alignment of the mesophase system via application of the magnetic field, the system may be polymerized to form a polymer film having aligned or oriented nanomaterials therein. Polymerization may be performed via, thermal polymerization, free radical polymerization, catalyst induced polymerization, or any other polymerization technique as would be understood by those skilled in the art. In certain embodiments, the polymerization is free radical polymerization. In certain embodiments, the film may include a well maintained alignment of structures along the field direction, or substantially perpendicular to the film surface.

EXAMPLES

The invention is now described with reference to the following Examples. These Examples are provided for the purpose of illustration only, and the invention is not limited to these Examples, but rather encompasses all variations that are evident as a result of the teachings provided herein.

Demonstrated herein is the phase behavior and alignment of a stable, single-phase, multi-component system that simultaneously forms an anisotropic lyotropic mesophase and supports the inclusion of polymerizable species. Importantly, the system possesses a thermally accessible order-disorder transition to facilitate rapid alignment, and the system also includes dispersants to stabilize nanotubes against aggregation. Magnetic field strengths as low as a few Tesla are suitable for directing the alignment of hexagonally packed cylindrical micelles on timescales of less than one hour, and these micelles template the alignment of the sequestered nanomaterials, such as carbon nanotubes. Polymerization of the mesophase by exposure to 365 nm UV light produces a mechanically robust polymer film that maintains the aligned structure imposed by the magnetic field on the precursor phase. As contemplated herein, this approach can be used to fabricate polymer films in which SWNTs are aligned with their long axes perpendicular to the film surface.

Preparation of Lyotropic Matrix

A stable lyotropic LC mesophase was formed of 47.5% dodecyltrimethlyammonium bromide (Sigma Aldrich, St. Louis, Mo.), 33% deionized water, 18% hydroxyethyl methacrylate (Sigma Aldrich, St. Louis, Mo.), 1% poly(ethylene glycol)-400 dimethacrylate (Sigma Aldrich, St. Louis, Mo.), and 0.5% Darocur TPO (Ciba, Basel, Switzerland). The sequestered nanomaterials, in this case single-walled carbon nanotubes (SWNTs) are introduced to the system via dispersal in the aqueous phase.

Figure 8:
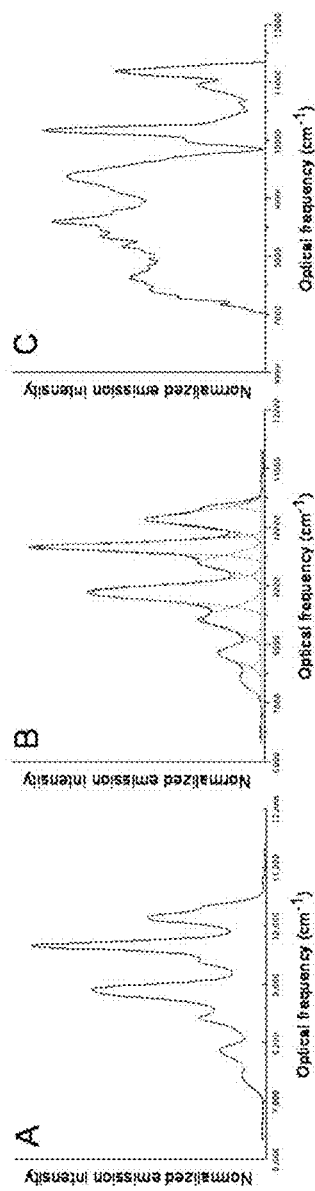
FIG. 8, comprising
Figure 10:
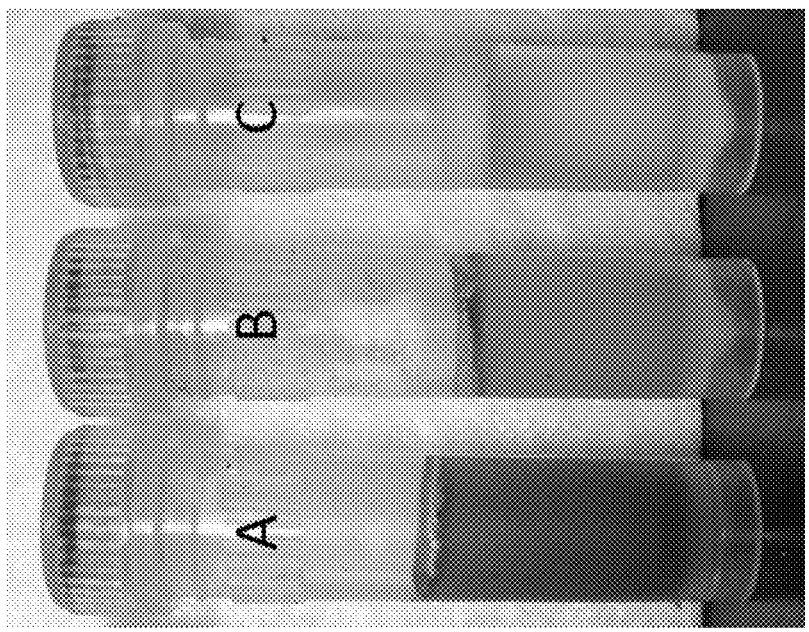
FIG. 10, comprising

To facilitate this dispersion, a 1% sodium taurodeoxycholate hydrate solution was prepared initially containing 1 g/L SWNTs prepared by CO disproportionation over highly dispersed cobalt substituted MCM-41 and an amorphous silica catalyst at 600° C. The solution was suspended in an ice bath and probe sonicated for 1 hour. After sonication, the solution was centrifuged in a Sorvall RC 6+ Centrifuge (Thermo Fisher, Waltham, Mass.) at 25,000 g for 1 hour to separate aggregated SWNTs. In the event of persistent aggregation, the sonication and centrifugation procedure was repeated. The solution visibly decreased in SWNT density, but the near-infrared data demonstrated singly dispersed SWNT at the conclusion of this procedure (FIG. 8). Dispersion was maintained across the range of weight percent SWNT in matrix tested, approximately 0.028%-0.076% (FIG. 10). The effects of 0.33% of TDOC on the phase behavior of the LC mesophase were undetectable.

Magnetic Alignment of LC Mesophase

Aligned LC mesophase samples were prepared in both thin-film (roughly 0.1-0.25 mm thickness) and bulk (1-3 mm thickness) geometries. The alignment and phase behavior between the two sample geometries was consistent, demonstrating that surface effects were undetectable or otherwise negligible. Alignment was conducted in a superconducting magnet with tunable static field strength up to 6 Tesla (American Magnetics, Oak Ridge, Tenn.). The temperature of the samples in the magnetic field was manipulated through a programmable temperature controller (Omega, Stamford, Conn.) that provided temperature control within 0.1° C. of set points. The LC mesophase was heated to 65° C. and held at that temperature for 1 minute before cooling through $T_{ODT}$ to 35° C. at a rate of 0.5° C./minute. Two hours of sample annealing under the field between 30° C. and 35° C. further improved the orientational order in the system. Alignment of the mesophase was confirmed via X-ray scattering on a Rigaku S-MAX 3000 (Tokyo, Japan) with 2D small-angle (SAXS) and wide-angle (WAXS) detectors.

Polymerization

The aligned mesophase was polymerized under 365 nm ultra-violet lamp with an intensity of 500 µW/cm$^2$ (UVP, Upland, Calif.).

Polarized Raman Spectroscopy

The alignment of sequestered SWNTs was determined using a Renishaw in Via confocal Raman microscope (Renishaw, Gloucestershire, United Kingdom) equipped with a polarizer and a half wave plate for orientational analysis. Using an excitation wavelength of 488 nm, the Raman shift of the sample was obtained over the region of interest from 1250 cm$^{-1}$ to 1750 cm$^{-1}$ at sample rotations of 0°, 90°, and 180°. The variation in Raman signal intensity of the characteristic graphene (G) band peak at 1590 cm$^{-1}$ was considered by appropriate normalization of the G-band peak intensity to the average baseline intensity between 1525 and 1550 cm$^{-1}$.

Figure 2:
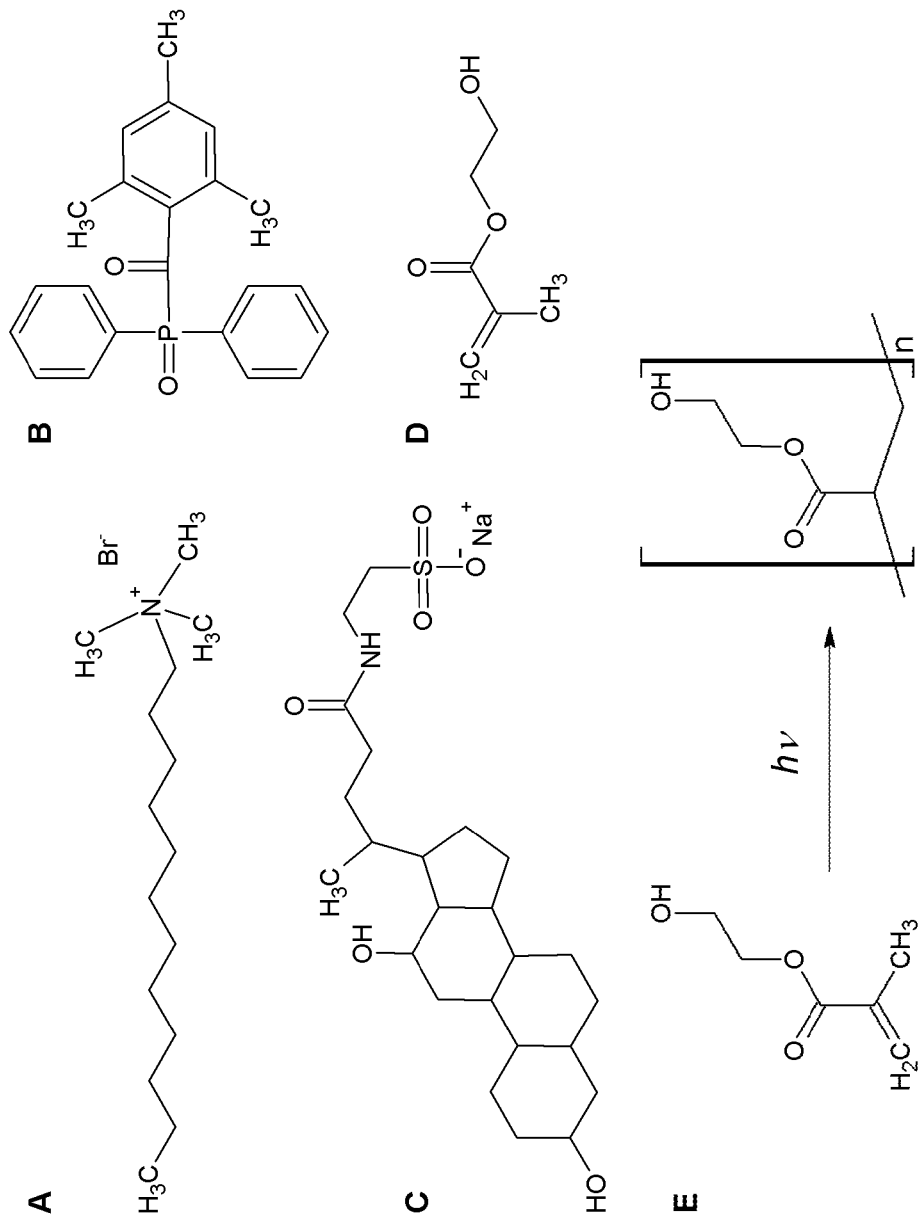
FIG. 2, comprising

As demonstrated herein, SWNTs were sequestered and aligned within a stable lyotropic LC mesophase composed of surfactant dodecyltrimethlyammonium bromide (DTAB), monomer hydroxyethyl methacrylate (HEMA), solvent (water), crosslinker poly(ethylene glycol)-400 dimethacrylate, and photoinitiator Darocur TPO, the chemical structures of which are depicted in FIG. 2. A systematic survey of the phase behavior of the multicomponent system of the present invention was conducted as a function of temperature and composition. Polarized optical microscopy (Zeiss Axiovert 200M with crossed polarizers) was used to record textures of birefringent samples and X-ray scattering (Rigaku S-MAX 3000 with 2D small-angle (SAXS) and wide-angle (WAXS) detectors) was used to characterize periodicities for phase identification. The $H_I$ phase space was isolated by using a polarized optical microscope at room temperature to categorize LC textures. X-ray scattering revealed the characteristic 1:3 ratios of the square of scattering vector peak locations seen for hexagonally packed structures, as shown in FIG. 2A. The primary reflection was at q=0.191 Å$^{-1}$, corresponding to a d-spacing of 3.3 nm, and a cylinder-to-cylinder spacing of 3.7 nm.

Figure 3:
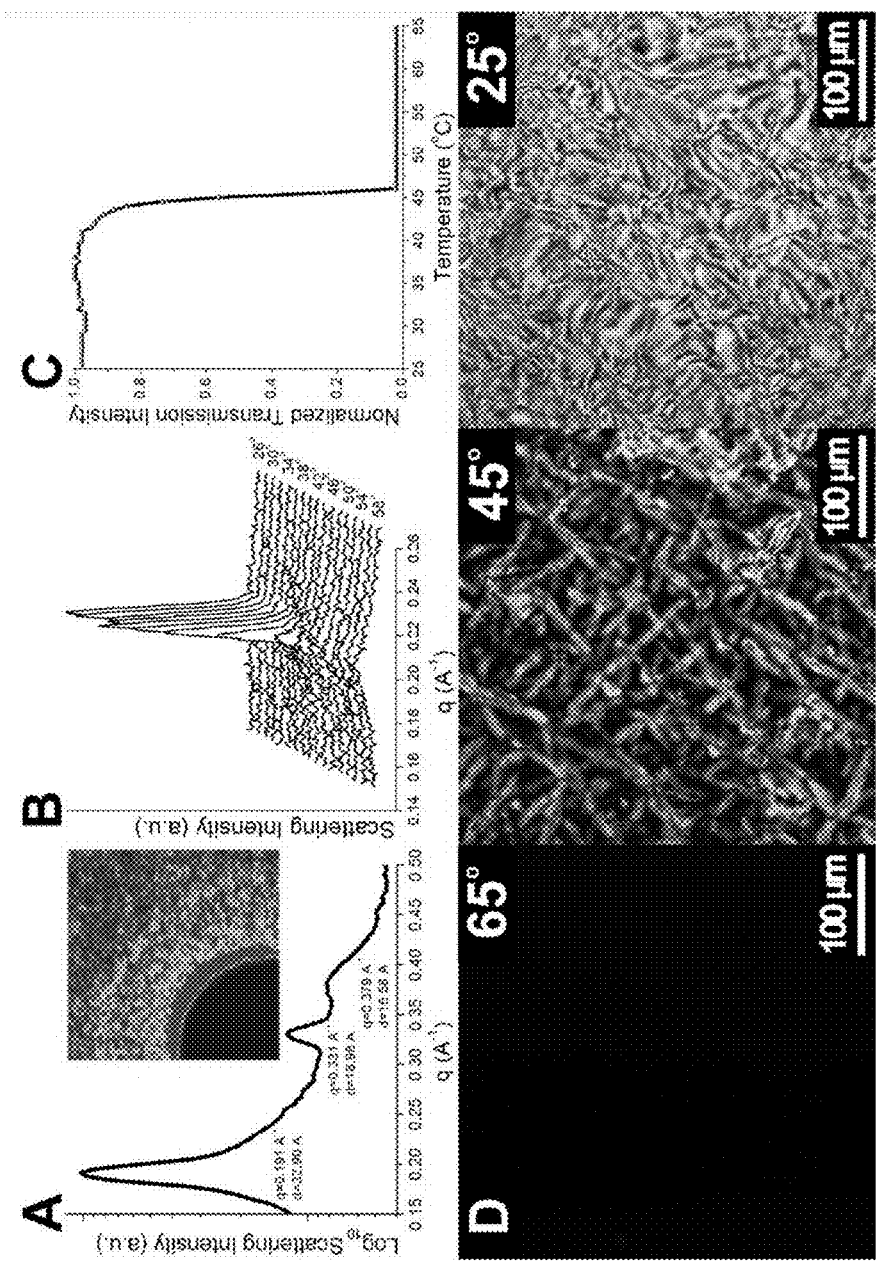
FIG. 3, comprising

Temperature dependent SAXS was used to determine $T_{ODT}$ from the decay of the primary scattering peak of the hexagonal structure with increasing temperature. A smooth, hysteresis free transition from the hexagonally packed $H_I$ phase to a disordered micellar phase occurred around 42° C., as shown in FIG. 3B. This was confirmed by temperature dependent optical microscopy, in which a plot of transmitted light intensity as a function of temperature displayed an ODT near 45° C., as shown in FIGS. 3C and 3D. This relatively low temperature, with respect to the boiling point of the solvent (water), afforded a non-trivial benefit over the use of surfactants such as sodium dodecyl sulfate, which did not display a thermally accessible clearing temperature in aqueous lyotropic assemblies. The phase boundary at 42° C. enabled facile, complete and rapid alignment of the host matrix when slowly cooled across this transition under the applied field. In the absence of the field, however, the matrix was sufficiently viscous at room temperature to preserve alignment during characterization and subsequent polymerization of the gel. These were crucial features of the multi-component system for the efficient realization of magnetically aligned nanocomposites.

Prior work on the phase behavior of binary lyotropic mesophases consisting of DTAB and water identified the existence of an $H_I$ phase between 56% and 73% DTAB by weight, and a coexistence region of hexagonal and micellar phases between 56% and 20% (w/w) (McGrath, 1995, Langmuir 11:1835-1839). No order-disorder transition was reported for the $H_I$ phase on increasing temperatures up to the boiling point of the solvent (water) at 100° C. However, the phase behavior of the ternary DTAB, HEMA, and water system described herein differs from the phase behavior of the binary system in two critical aspects. First, the ternary system possesses an order-disorder transition at moderate temperatures (<50° C.) between a birefringent hexagonal phase and a non-birefringent isotropic micellar phase. Second, the $H_I$ phase of the ternary system was shifted to lower DTAB concentrations. One of the critical drawbacks in the utilization of lyotropic surfactant mesophases is the typically large volume fraction occupied by the surfactant in the system. For example, in the $H_I$ phase of the binary DTAB and water system, the surfactant can account for up to 73% of the total volume, leaving only 27% of the phase space available for a solvent phase that serves as a vehicle for introducing the nanomaterial. In contrast, the shift of the $H_I$ phase to lower surfactant concentrations (such as DTAB) in the ternary system increases the volume of the system available for the inclusion of other functional components. The phase behavior observed herein was consistent with that reported for amphiphilic cationic monomers based on DTAB (Lester et al., 2002, Polymer 43:3707-3715).

Figure 9:
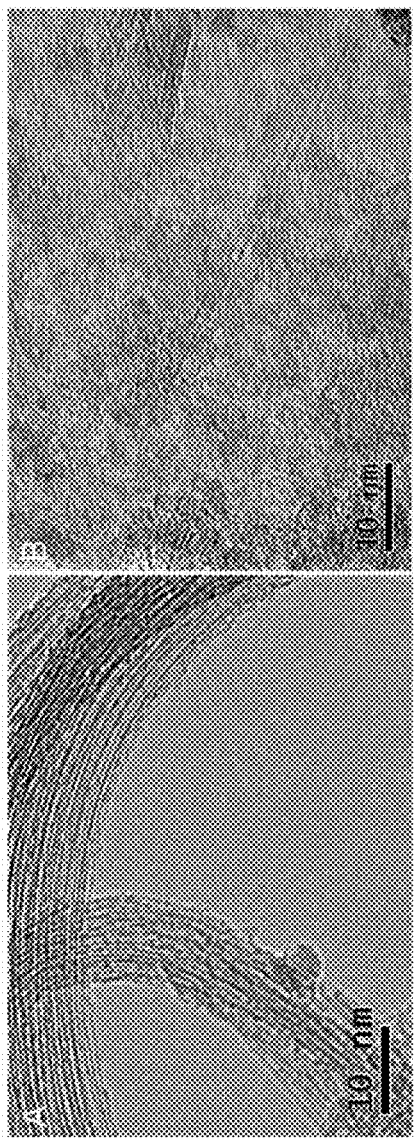
FIG. 9, comprising

In preferred embodiments, the structure-directing mesophase should exhibit both strong diamagnetic anisotropy of susceptibility and efficient dispersion of the nanomaterial. As described and experimentally demonstrated herein, alignment of the nanotubes was generated by their sequestration into the micellar cores of the diamagnetically anisotropic DTAB cylindrical micelles. The alkyl tails of the surfactant adsorb to the hydrophobic SWNTs to simultaneously disrupt the van der Waals attractive forces between SWNTs and confine the individual nanotubes within the cylindrical micelles (Wenseleers et al., 2004, Advanced Functional Materials 14:1105-1112). Enthalpically favorable interaction between the nanotube and the cylindrical micelle couples the orientation of these two uniaxial species, such that alignment of the SWNTs results from alignment of their confining mesophase structures. The dispersion of the nanotubes, i.e. their stabilization in the micellar cores, represents a secondary role for the surfactant molecules comprising the host matrix. The efficiency with which the surfactant disperses the nanotubes in solution enforces a limit on the density of single dispersed SWNT in the final nanocomposite. In the present system, the limited efficacy of DTAB as a dispersing agent was overcome by first debundling the SWNTs in a 1% solution of sodium taurodeoxycholate (TDOC) (FIG. 8). The sharp absorbance peaks (van Hove singularities) of the near-IR spectra at 785 nm excitation wavelength suggest effective dispersion of the SWNTs (Chatterjee et al., 2005, Advanced Functional Materials 15:1832-1838; Saito et al., 1998, Physical Properties of Carbon Nanotubes. Imperial College: London), in the TDOC solution and the supporting matrix. Alternatively, small angle neutron scattering (SANS) may be used as a metric for quantifying SWNT dispersion (Fagan et al., 2006, J Phys Chem B 110:23801-23805). In lieu of SANS experiments, SWNT dispersion was further corroborated by comparing transmission electron microscopy (TEM) images before and after the surfactant-aided debundling of the SWNTs (FIG. 9).

Alignment was conducted in a superconducting magnet with tunable static field strength up to 6 Tesla (AMI—American Magnetics, Inc.). The magnet features orthogonal room-temperature bores, one of which housed the apparatus. The sample chamber was isolated from the ambient conditions of the bore and was temperature controlled to ±0.1° C. for precise thermal treatment of samples. Material was loaded at room temperature into circular sample cells 1-2 mm thick and 5 mm in diameter. To perform alignment, the composite SWNT-DTAB mesophase was heated above its order-disorder transition temperature into the isotropic micellar phase, and slowly cooled at 0.5° C./min back into the $H_I$ phase in the presence of a 5 T field.

Figure 4:
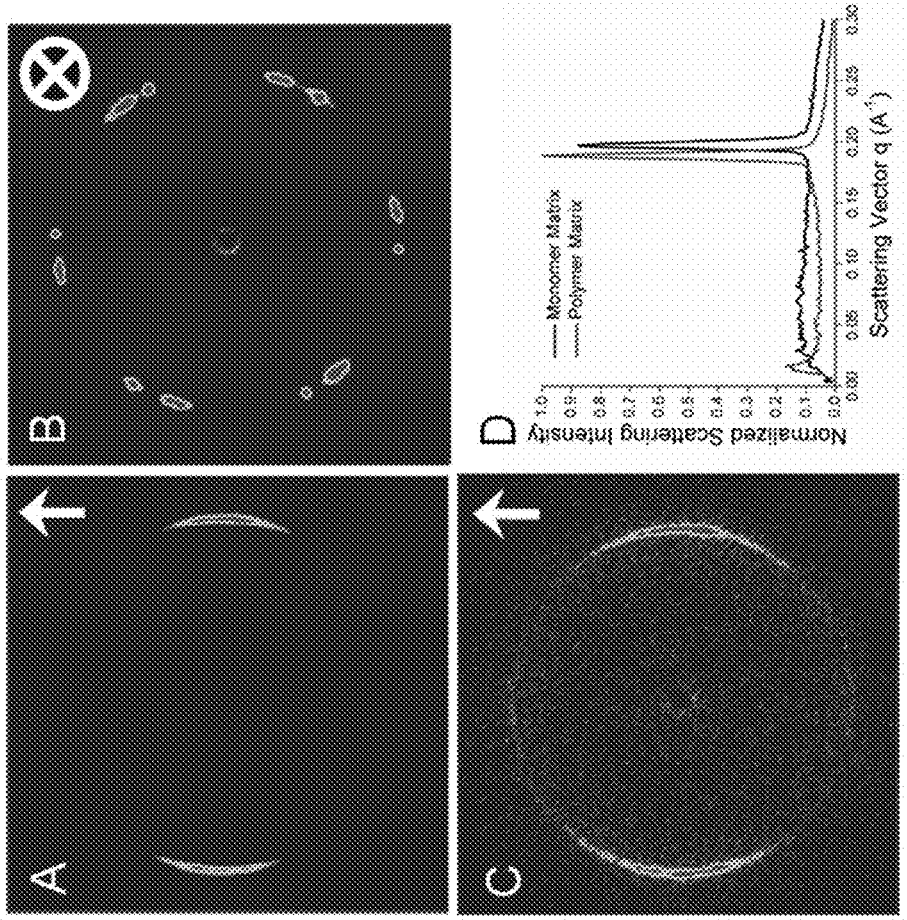
FIG. 4, comprising
Figure 5:
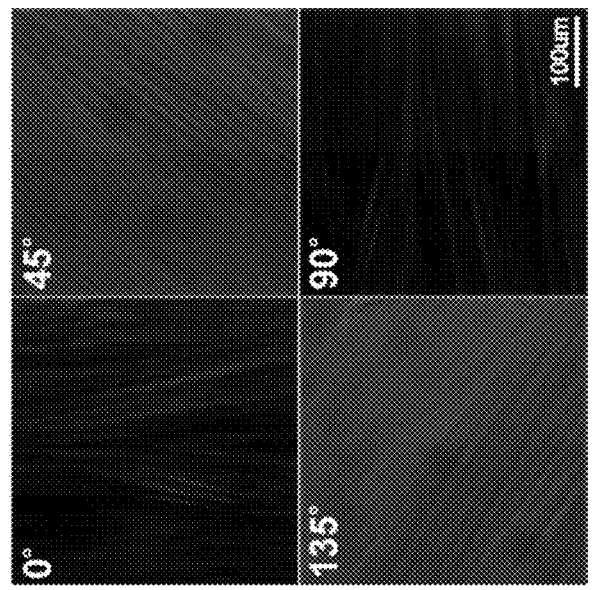
FIG. 5 are angle dependent, polarized optical micrographs of an aligned system showing near uniform extinction and passage of light over large areas.

After alignment, the sample holder was transferred from the magnet to the SAXS instrument for characterization of the mesophase alignment. Two-dimensional SAXS patterns demonstrate controlled in-plane and out-of-plane alignment of the system. In FIG. 4A, the concentration of the scattered intensity along the equatorial direction indicates that the cylindrical micelles are aligned with their long axes along the field direction, which is indicated by the arrow. In FIG. 4B, datum is presented for the same sample after physical rotation and re-alignment in the field. The scattering plane is now perpendicular to the field line. The datum show two 6-fold symmetric patterns, indicating that there are contributions from 2 large grains with slightly different angular orientations in-plane, with the hexagonally packed cylinders aligned along the field direction. The x-rays sample a region roughly 0.5 mm in diameter, so the alignments produced here are coherent over that length scale. Polarized optical microscopy was also used to confirm the production of large area monodomains (FIG. 5).

Figure 6:
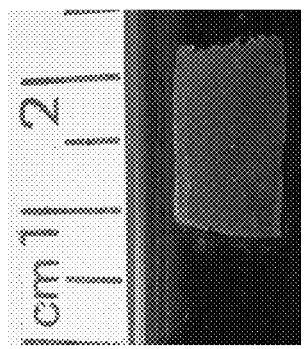
FIG. 6 is picture of polymer film containing vertically aligned SWNT. Film thickness is roughly 1 mm.

The aligned samples were polymerized by exposure to UV light (365 nm) to form a poly(hydroxylethyl methacrylate) polymer film containing surfactant-coated aligned SWNTs. Crucially, the alignment and periodicity of the mesostructure in the polymer film are unchanged relative to those of the lyotropic precursor. The 2-D SAXS pattern taken from the polymerized sample shows a well maintained alignment of structures along the field direction (FIG. 4C). The primary reflection is at $q=0.189$ Å$^{-1}$, corresponding to a d-spacing of 3.3 nm, which is only slightly increased relative to the 3.2 nm of the hexagonally ordered precursor (FIG. 4D). The film produced is mechanically robust and has a clear, uniform appearance (FIG. 6).

X-ray scattering cannot provide a viable measure of nanotube alignment due to the low concentration of nanotubes and limited electron density contrast between the SWNTs and the host mesophase. Instead, polarized Raman spectroscopy was used to provide a statistically relevant indication of SWNT alignment within the polymer nanocomposite. The distinct Raman modes of the SWNT and host matrix (FIG. 7A) were used to assess alignment using polarized Raman spectroscopy.

Figure 7:
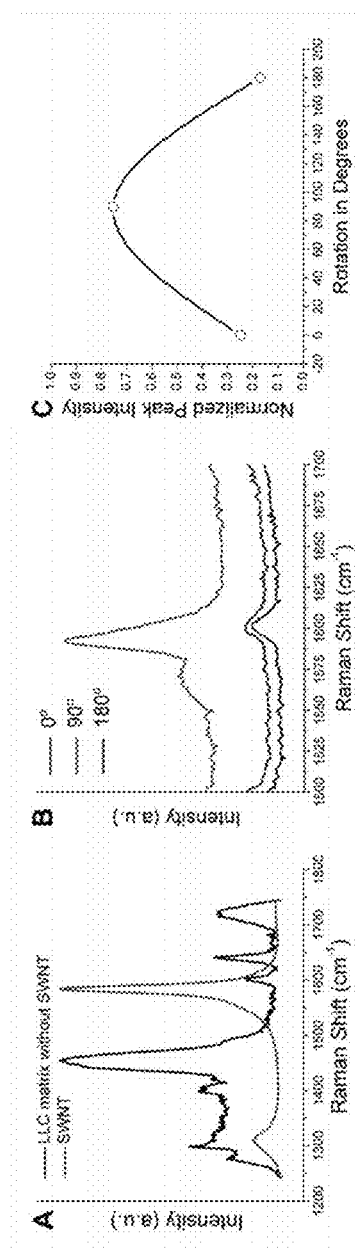
FIG. 7, comprising

SWNTs display characteristic peaks at Raman shifts of 1350 and 1590 cm$^{-1}$, corresponding to the first order peaks of amorphous carbon and 2-D graphite, respectively. These Raman modes show maximum intensity when the polarization of the incident radiation (electric field oscillation) is parallel to the nanotube long axis, such that a matrix of aligned SWNTs will exhibit peak-to-valley variations in the Raman intensity as the sample is rotated in 90° increments (Duesberg et al., 2000, Phys. Rev. Lett. 85(25):5436-5439). At 0°, or when the long-axis of the nanotube is perpendicular to the polarization of the excitation laser's oscillating electromagnetic field, the Raman scattering from the SWNTs should display a minimum. At 90°, however, the Raman signal intensity of the SWNT peaks is maximized due to enhanced absorption, molecular polarization, and optical conductivity along the long-axis of the nanotube (Ajiki et al., 2004, Physica B: Condensed Matter 201:349-352). Rotation of the sample by a further 90° should result in drastically reduced signal as the SWNT long axes again become orthogonal to the direction of electric field oscillation of incident light. This is precisely what was observed. Raman scattering intensities were recorded at 3 sample orientations, spaced by 90°, with respect to the polarization of incident light (FIGS. 7B and 7C). The variation in Raman signal intensity was considered by appropriate normalization of the SWNT peak at 1590 cm$^{-1}$ to the baseline average between 1525 and 1550 cm$^{-1}$.

The disclosures of each and every patent, patent application, and publication cited herein are hereby incorporated herein by reference in their entirety.

While the invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed:

1. A method of aligning a nanomaterial in a polymeric film, comprising the steps of:
adding at least one nanomaterial into a mesophase comprising at least one surfactant and at least one monomer;
applying a magnetic field to the mesophase, wherein the at least one surfactant and at least one nanomaterial at least partially align in response to the magnetic field;

polymerizing the mesophase to form a film containing the at least partially aligned surfactant and nanomaterial;

raising the temperature of the mesophase such that the at least one surfactant is in a disordered state prior to applying the magnetic field to the mesophase; and controlling the rate of cooling of the mesophase as the surfactant returns to an ordered state while the magnetic field is applied.

2. The method of claim 1, wherein the mesophase further comprises a crosslinker.

3. The method of claim 1, wherein the mesophase further comprises a photoinitiator.

4. The method of claim 3, wherein the monomer is polymerized by exposing the mesophase to UV light.

5. The method of claim 1, wherein the at least one surfactant is dodecyltrimethylammonium bromide (DTAB).

6. The method of claim 1, wherein the at least one monomer is hydroxyethylmethacrylate (HEMA).

7. The method of claim 1, wherein the nanomaterial is a single walled carbon nanotube.

8. The method of claim 2, wherein the crosslinker is poly(ethylene glycol)-400 dimethacrylate.

9. The method of claim 3, wherein the photoinitiator is 2,4,6-trimethylbenzoyl-diphenylphosphine oxide.

10. The method of claim 1, wherein the nanomaterial is mixed in a solution comprising a dispersing agent prior to adding the nanomaterial to the mesophase.

11. The method of claim 10, wherein the dispersing agent is sodium taurodeoxycholate (TDOC).

12. A polymeric film formed by the method of claim 1.

13. The method of claim 5, wherein the amount of DTAB in the mesophase is between 30-60%.

14. The method of claim 6, wherein the amount of HEMA in the mesophase is between 10-30%.

15. The method of claim 1, wherein the at least partial alignment of the at least one surfactant and nanomaterial is directed by a magnetic field strength of less than 6 Tesla (T).

16. A method of fabricating a nanocomposite, comprising the steps of:

adding at least one nanomaterial into a mesophase comprising dodecyltrimethylammonium bromide (DTAB), hydroxyethylmethacrylate (HEMA), poly(ethylene glycol)-400 dimethacrylate and 2,4,6-trimethylbenzoyl-diphenylphosphine oxide, raising the temperature of the mesophase such that the mesophase is in a disordered state;

applying a magnetic field having a strength of less than 6 Tesla to the mesophase, wherein the DTAB at least partially aligns in response to the magnetic field;

controlling the rate of cooling of the mesophase as it returns to an ordered state; and polymerizing the mesophase to form a polymeric film containing the at least one nanomaterial, wherein the at least one nanomaterial is a single walled carbon nanotube.

* * * * *